United States Patent [19]

Giesselmann

[11] Patent Number: 5,665,208
[45] Date of Patent: Sep. 9, 1997

[54] METHOD AND APPARATUS FOR THE QUANTITATIVE ENRICHMENT OF VOLATILE COMPOUNDS BY CAPILLARY DISTILLATION

[75] Inventor: Günter Giesselmann, Heusenstamm, Germany

[73] Assignee: Eppendorf-Netheler-Hinz GmbH, Hamburg, Germany

[21] Appl. No.: 493,083

[22] Filed: Jun. 21, 1995

[30] Foreign Application Priority Data

Jun. 21, 1994 [DE] Germany ............... 44 21 627.0

[51] Int. Cl.⁶ ............................................. B01D 3/00
[52] U.S. Cl. ............ 203/12; 159/906; 159/DIG. 28; 159/DIG. 15; 202/184; 202/200; 202/203; 202/267.1; 203/39; 203/86
[58] Field of Search ............... 203/86, 12, 39; 202/267.1, 184, 200, 203; 159/906, DIG. 15, DIG. 28, DIG. 4; 165/104.26; 261/100, 107, 94, 99

[56] References Cited

U.S. PATENT DOCUMENTS

| 3,151,061 | 9/1964 | Orr | 159/DIG. 4 |
|---|---|---|---|
| 4,040,975 | 8/1977 | Wittensheim | 159/4.01 |
| 4,118,285 | 10/1978 | Yeh | 203/86 |
| 4,265,700 | 5/1981 | Billgren et al. | 159/47.1 |
| 4,846,935 | 7/1989 | Giesselmann et al. | 203/86 |
| 5,043,061 | 8/1991 | Inagaki | 159/906 |

FOREIGN PATENT DOCUMENTS

| 0422427 | 9/1974 | U.S.S.R. |
| 0547390 | 7/1977 | U.S.S.R. |
| 0640976 | 1/1979 | U.S.S.R. |
| 1321685 | 7/1987 | U.S.S.R. |
| 1330405 | 8/1987 | U.S.S.R. |
| 1402762 | 6/1988 | U.S.S.R. |

*Primary Examiner*—Virginia Manoharan
*Attorney, Agent, or Firm*—Anderson Kill & Olick, P.C.

[57] ABSTRACT

A quantitative enrichment of volatile compounds from substances of the macro- to submicro field in a short time is realized by capillary distillation in a system which includes an evaporator vessel, on the bottom of which one or more filter plates are provided and which is connected to a condensing vessel by means of a capillary tube. The presence of filter plate(s) guarantees a uniform and constant boiling which facilitates the quantitative isolation of the volatile compounds.

26 Claims, 7 Drawing Sheets

METHOD AND APPARATUS FOR THE QUANTITATIVE ENRICHMENT OF VOLATILE COMPOUNDS BY CAPILLARY DISTILLATION

BACKGROUND OF THE INVENTION

According to the EP 0248987 B 1, an upgrading method for volatile compounds has become known, according to which the enrichment of volatile compounds from liquid and solid substances containing said volatile compounds is possible in a closed system without using any auxiliary substances if it is carried through by heating the basic material at elevated temperatures and condensing the volatile substances at lower temperatures in a system which consists of an evaporator- and condensing vessel as well as a capillary tube connecting said vessels and having an inside diameter of less than 1 mm. The method according to the EP 0248987 B1 did allow an enrichment of the volatile substances in the condensate which had not been known before. For this purpose, however, a relatively high expenditure of time had been necessary.

SUMMARY OF THE INVENTION

There had been found out now that a quantitative enrichment of volatile compounds from liquid or suspended substances of the macro- to submicro field (ppm-ppb) containing said compounds is possible in a short time by capillary distillation of these substances and condensing or absorbing the volatile compounds if the enrichment is carried through in a system which consists of an evaporator vessel, on the bottom of which one or more filter plates are provided which guarantee a continuous and constant development of steam bubbles during boiling, a condensing vessel and a capillary tube connecting said vessels.

Filter plates may consist of the most different materials, such as glass, quartz, porcelain, clay, precious metal and synthetic material, such as teflon, PEEK (polyetheretherketone), etc. Preferably, purchasable filter plates of borosilicate glass are employed.

In the inventive systems, preferably, cylindrical evaporator vessels with flat bottom are used. The form of the evaporator vessel is not decisive for the effectiveness of the filter plates to form steam bubbles, they even are fully effective on an arched bottom.

As condensing vessels, preferably, small threaded bottles or beaded rim bottles with ranged cap are used. The size depends on the quantity of the condensate.

As a cover for the condensing vessels, in particular, silicone sepia are suited which are centrically slotted or provided with a bore. A capillary tube can be inserted therethrough very easily. Besides, these covers also guarantee a sufficient venting of the condensing vessel in order to be able to carry through the capillary distillation without problems.

Moreover, in the inventive system a capillary tube having an inside diameter of less than 1 mm proved to be very advantageous.

The suitable materials for the capillary tubes depend on the chemical properties of the volatile compounds to be enriched. Capillary tubes of fused amorphous silicon dioxide, so-called "fused silica" capillary tubes, are particularly advantageous but those of synthetic material, such as polyfluoroethylene (teflon) and polyetheretherketone (PEEK) are advantageous as well.

For the enrichment of basic volatile compounds, such as amines, a base basicity of the capillary tubes is necessary which for "fused silica" capillary tubes can be easily obtained by basic leaching.

The length of the capillary tubes and their inside diameter have a certain influence on the transport procedures. So, for the capillary distillation of unstable volatile compounds, which should not be exposed to elevated temperatures for an unnecessarily long time, a short capillary tube having an average inside diameter of 0.20 to 0.32 mm is convenient. Short capillary tubes are those having a length of 100 to 500 mm.

Surprisingly, however, capillary tubes having a length of 500 mm or many meters are suitable for fractionated capillary distillations, e.g. for the separation of organic solvents adapted to be mixed with water. The overpressure in the evaporator vessel occurring thereat at the beginning can be avoided by preheating the capillary tubes. For short capillary tubes a regulation of the substance transfer is possible by cooling the capillary tubes below room temperature. It comes true for all lengths of capillary tubes that heating increases the substance transfer through the capillary tubes while it is reduced by cooling. For single capillary distillations not fractionated lengths of capillary tubes of 100–500 mm, preferably those having a length of 150–230 mm, have well proven.

For an optimum function of the inventive system a continuous and constant development of steam bubbles in the boiling liquid is necessary. Boiling stones are useless for the inventive system as they often lose their effectiveness or are not effective at all. Surprisingly, porous filter plates proved to be very suitable. In consequence of the use of these filter plates so many uniformly distributed steam bubbles are formed in the boiling liquid or suspension that even submicroquantities of volatile substances are expelled and quantitatively transported into the condensing vessel through the capillary tubes. This is more detailedly explained with the aid of examples 1 to 12. Compared to this, the cyanide determination according to DIN 38405 e.g. involves quite some expense: a relatively large sample quantity of 100 ml is required and needs to be heated to boiling point for one hour in a complicated apparatus by, at the same time, passing therethrough 20 l/h of air for quantitatively enriching the hydrocyanic acid. According to the inventive system, maximally 1/10 of the sample quantity and only half the time of experimentation are required for the same procedure. The inventive system can be operated individually or in groups. If there is an arrangement of 6 units, for example, the sample throughput per unit of time is increased by factor 6. Consequently, in the inventive system any additional measures, such as the generation of vibrations, see W. Dunges, Prächromatographische Mikromethoden, publisher: Dr. A. Hüthig, pages 86–87, can be renounced.

Even in aqueous suspensions, e.g. suspensions of samples of the soil, a filter plate including pores Within the range of 160 ... 250 μm still forms sufficient steam bubbles in order to guarantee a uniform boiling.

Instead of one filter plate, several correspondingly smaller filter plates can be used for the inventive system as well. The total surface of a single or several filter plates, preferably, should cover 25% of the bottom surface of the evaporator vessel.

As appears from Table 1, a different overpressure is generated inside the evaporator vessel according to the inside diameters of the capillary tubes. Under such conditions, it was not to be expected that filter plates would be capable of forming steam bubbles at all. In any case, boiling stones are very problematic under such conditions. See also Ullmann vol. 2/1, page 71, 1961, second complete paragraph.

Table 1

Pressure ratios for the boiling point of water in closed 20 ml beaded rim bottles for headspace analytics being provided with a capillary tube and manometer, wall 0.95 mm, volume 10 ml of water.

| Capillary tube, inside diameter mm | Overpressure mbar |
| --- | --- |
| 0.20 | 210 |
| 0.25 | 160 |
| 0.32 | 140 |
| 0.53 | 80 |

Table 2 provides a survey of the distillation characteristics of water and ethanol in the presence of filter plates of different porosity in closed 20 ml beaded rim bottles as they are used for the headspace analytics. Through the septum of the sealing cap fused silica capillary tubes with different inside diameters had been inserted and the content of 10 ml had been heated to boiling point. It appears from the table that filter plates comprising pores within the range of 160 . . . 250 and 100 . . . 160 μm are most convenient for water as well as for ethanol, that is for all inside diameters of capillary tubes from 0.20 to 0.53 mm. If there are concerned filter plates including pores within the range of 40 . . . 100 μm the steam bubbles formed are no longer capable of passing through the pores of the filter plate, however, the steam bubbles uniformly rising from the edge of the filter plate are advantageous for many applications since the boiling procedure takes place slightly damped as a result.

Table 2

Distillation characteristics of water and ethanol in the presence of filter plates of different porosity in closed 20 ml beaded rim bottles being provided with a capillary tube. Volume 10 ml.

| Glass filter plate max. pore width μm | Volume 10 ml | Capillary tube, inside diameter mm | Distillation characteristics |
| --- | --- | --- | --- |
| 160 . . . 250 | water | 0.20 | A |
| | | 0.25 | A |
| | | 0.32 | A |
| | | 0.53 | A |
| | ethanol | 0.20 | A |
| | | 0.25 | A |
| | | 0.32 | A |
| | | 0.53 | A |
| 100 . . . 160 | water | 0.20 | B |
| | | 0.25 | B |
| | | 0.32 | B |
| | | 0.53 | B |
| | ethanol | 0.20 | B |
| | | 0.25 | B |
| | | 0.32 | B |
| | | 0.53 | B |
| 40 . . . 100 | water | 0.20 | C |
| | | 0.25 | C |
| | | 0.32 | C |
| | | 0.53 | C |
| | ethanol | 0.20 | C |
| | | 0.25 | C |
| | | 0.32 | C |
| | | 0.53 | C |
| boiling stones | water | 0.20 | D–E |
| | | 0.25 | D–E |
| | | 0.32 | D–E |
| | | 0.53 | D–E |
| | ethanol | 0.20 | D–E |
| | | 0.25 | D–E |
| | | 0.32 | D–E |
| | | 0.53 | D–E |
| without auxiliary agents | water | 0.20 | E |
| | | 0.25 | E |
| | | 0.32 | E |
| | | 0.53 | E |
| | ethanol | 0.20 | E |
| | | 0.25 | E |
| | | 0.32 | E |
| | | 0.53 | E |

Explanations of:
A: Rising of midsize steam bubbles through the filter plate. Good distribution in all the liquid.
B: Rising of small steam bubbles through the filter plate. Good distribution in all the liquid.
C: Rising of steam bubbles around the edge of the filter plate. Average distribution in the liquid, damped boiling.
D: Formation of steam bubbles considerably depending on the kind and structure of the boiling stone. Steam bubbles rise, if at all, from a certain point of the boiling stone only, often in an abrupt manner. Altogether very unreliable since there often is a loss of efficiency after a short time.
E: There are no steam bubbles formed.

As a result of the inventive method, a reliable quantitative collection of volatile compounds from the substances containing said volatile compounds is possible, that is without gaseous auxiliary agents as well as without special additional arrangements. It is suitable for the isolation of volatile substances as they are required for the perfume industry, aroma research, cosmetics industry, for example, as well as for the isolation of volatile contaminants from waste water, samples of the soil, from pharmaceutical products, products of the food industry, from plant extracts, pesticides and for analytical purposes.

The inventive method is particularly suitable for the quantitative isolation of contaminants damaging the environment, such as free hydrocyanic acid and hydrocyanic acid set free from cyanides or complex cyanide ions as well as for the quantitative isolation of free hydrogen sulfide and hydrogen sulfide from waters and soils of any type, such as industrial waste waters, infiltration waters, soil samples and sludges, said hydrogen sulfide being set free from sulfides. Besides, it is most suitable for the quantitative isolation of ingredients from infiltration waters, such as chlorinated hydrocarbons, aromatic hydrocarbons, chlorinated aromatic and hydroaromatic hydrocarbons from infiltration waters containing said ingredients.

BRIEF DESCRIPTION OF THE DRAWINGS

The objects and feature of the present invention will now be explained on examples with reference to the accompanying drawings, wherein.

DETAILED DESCRIPTION OF THE PREFERRED EMBODIMENTS

Figure 1:
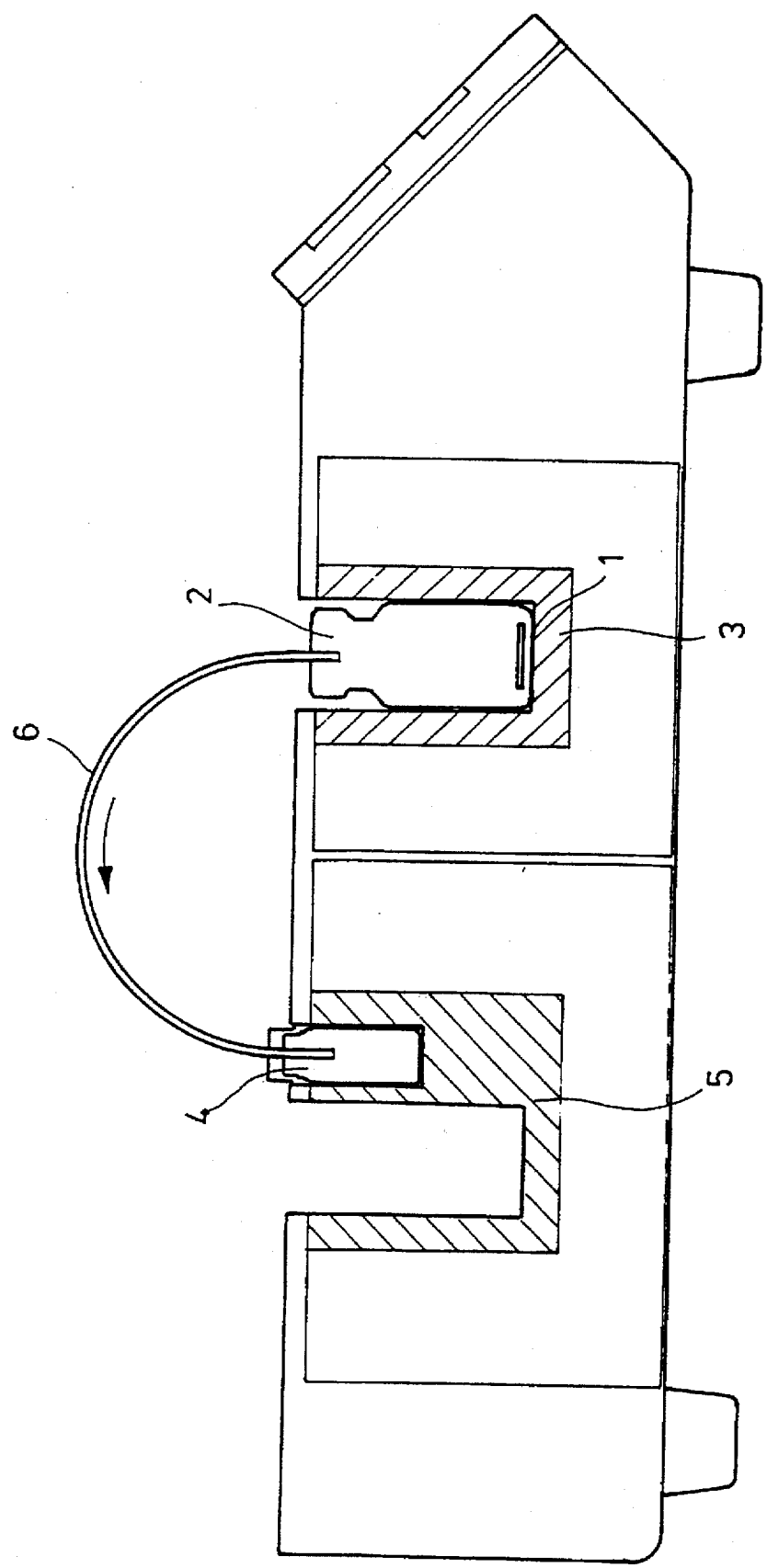
FIG. 1 shows a schematic view of a system for quantitative enrichment of volatile compounds by capillary distillation according to the present invention.

The system for the capillary destillation is schematically shown in FIG. 1: The evaporator vessel 2 including the glass filter plate 1is provided within a heatable block 3; the condensing vessel 4 is surrounded by a cooling block 5; the capillary tube 6 leads the gas transport from vessel 2 to the condensing vessel 4. The invention is more detailedly explained with the aid of the following examples, wherein the system according to FIG. 1 was used.

EXAMPLE 1

Quantitative isolation of hydrocyanic acid from a 10 ppb standard cyanide solution.

10 ml of a 10 ppb standard cyanide solution (pH 12) are pipetted into a 20 ml pressure resistant borosilicate glass with rolled flange, a filter plate of borosilicate glass, porosity range 100 to 160 µm, is inserted and flanged. Thereafter, there is inserted through the flanged cap a "fused silica" capillary tube having a length of 200 mm and an inside diameter of 0.32 mm and the evaporator vessel is positioned within the heating block still being cold. As condensing vessel a borosilicate glass with rolled flange, volume 10 ml, is used as well and 1 ml of a molar sodium hydroxide solution is used as an absorbent for the hydrocyanic acid. In the cooling block the condensing vessel is cooled to −2°C. The flanged cap of the condensing vessel contains a septum which in its center is provided with a bore of 1/16 inch through which the capillary tube of the evaporator vessel can be easily introduced. The capillary tube is submerged in the sodium hydroxide solution. By means of injecting 1 ml of a mixture of citrate buffer and phosphoric acid/hydrophosphoric acid (2+1) hydrocyanic acid is liberated from the solution to be analyzed and is driven over by heating to the recipient vessel for boiling. The boiling procedure is discontinued after 20 minutes. The contents of the recipient vessel is filled up with distilled water to exactly 10 ml and is analyzed by means of ionic chromatography with an anionic exchange column and an electrochemical detector.

Figure 2:
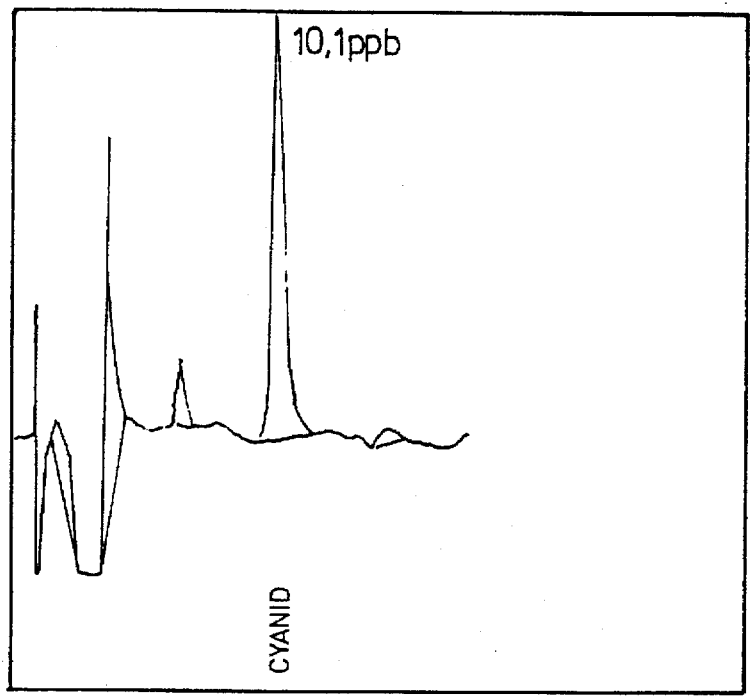
FIGS. 2–10 shows on ion chromatograms of materials separated in accordance with the inventive method, as described with reference to examples 1–10 below.

| Result: | Desired value | = | 10.0 ppb |
| --- | --- | --- | --- |
| | Effective value | = | 10.1 ppb (compare FIG. 2) |

In the following examples the evaporator vessel, filter plate, capillary tube, condensing vessel, acid mixture for liberating hydrocyanic acid or hydrogen sulfide, absorbent and analytics have not been changed unless mentioned to the contrary.

EXAMPLE 2

Quantitative isolation of hydrocyanic acid from a 10 ppb standard cyanide solution.

According to example 1, the hydrocyanic acid is quantitatively isolated from 10 ml of a 10 ppb standard cyanide solution (pH 12) within 20 minutes.

Figure 3:
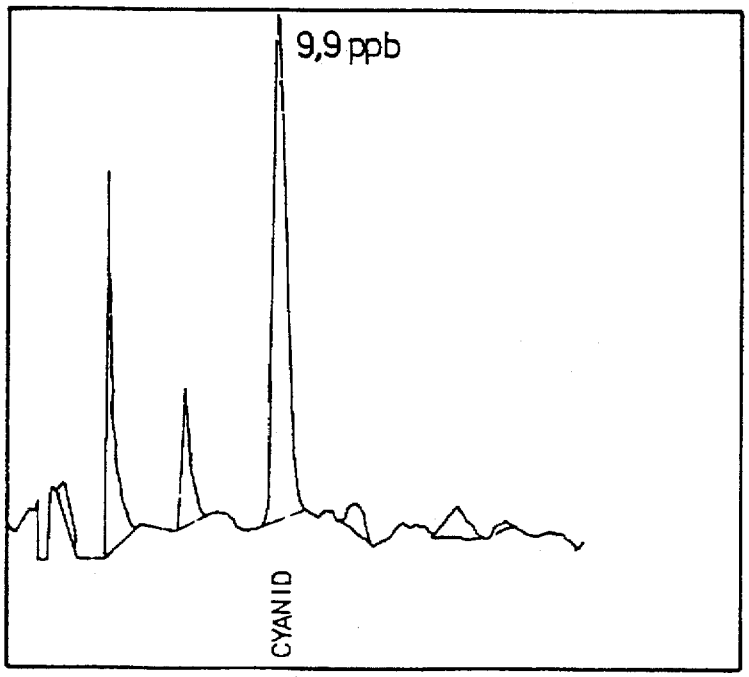

| Result: | Desired value | = | 10.0 ppb |
| --- | --- | --- | --- |
| | Effective value | = | 9.9 ppb (compare FIG. 3) |

EXAMPLE 3

Quantitative isolation of hydrocyanic acid from a 2 ppb standard cyanide solution.

According to example 1, the hydrocyanic acid is quantitatively isolated from 10 ml of a 2 ppb standard cyanide solution (pH 12) within 20 minutes.

Figure 4:
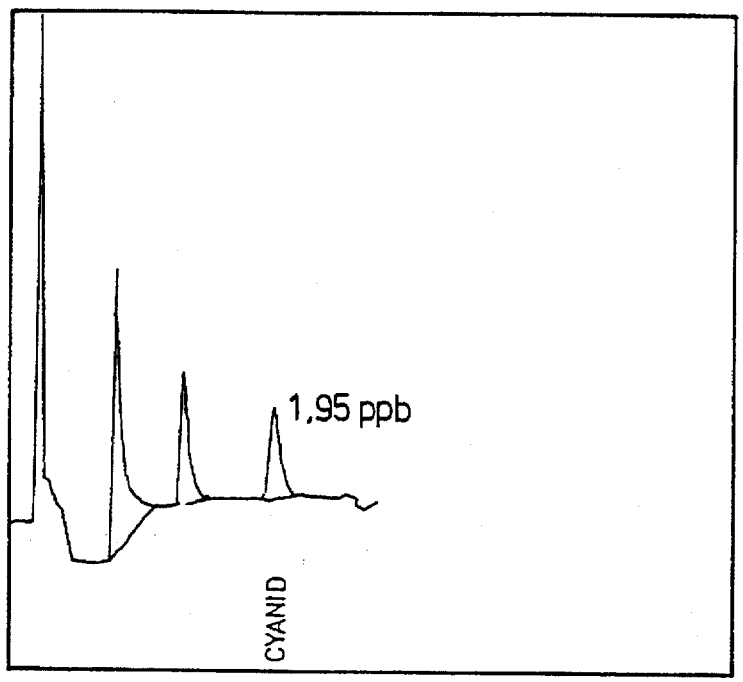

| Result: | Desired value | = | 2.0 ppb |
| --- | --- | --- | --- |
| | Effective value | = | 1.95 ppb (compare FIG. 4) |

EXAMPLE 4

Quantitative isolation of hydrocyanic acid from a 10 ppb standard cyanide solution.

According to example 1, the hydrocyanic acid is quantitatively isolated from 10 ml of a 10 ppb standard cyanide solution (pH 12) after 10 minutes already.

| Result: | Desired value | = | 10.0 ppb |
| --- | --- | --- | --- |
| | Effective value | = | 10.2 ppb |

EXAMPLE 5

Quantitative isolation of hydrocyanic acid from complex cyanide ions (potassium ferrocyanide, $K_4[Fe(CN)_6]$.

According to example 1, 10 ml of a 11.1 ppb cyanide solution of potassium ferrocyanide $K_4[Fe(CN)_6]$ are used. The mineralization of the complex is complete after a capillary distillation of 30 minutes.

Figure 5:
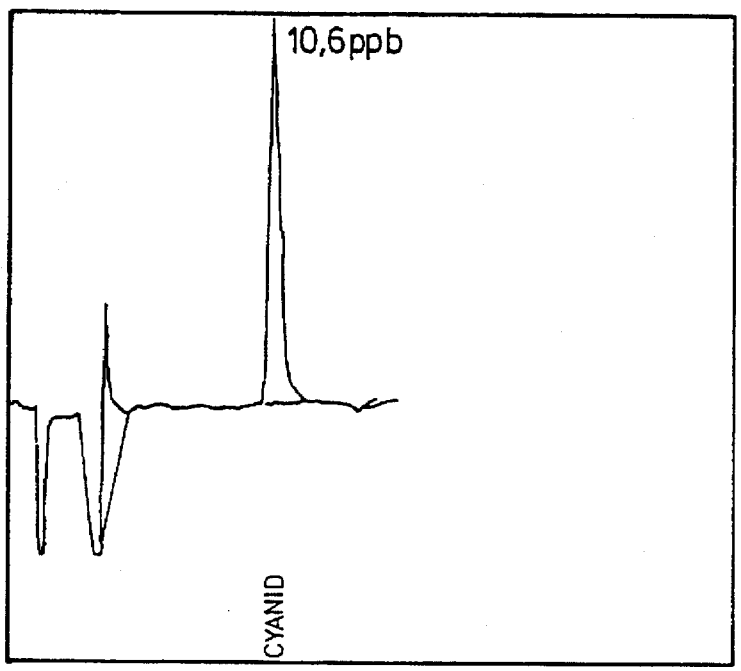

| Result: | Desired value | = | 11.1 ppb |
| --- | --- | --- | --- |
| | Effective value | = | 10.6 ppb (compare FIG. 5) |

EXAMPLE 6

Quantitative isolation of hydrocyanic acid from complex cyanide ions (potassium ferrocyanide, $K_4[Fe(CN)_6]$.

According to example 1, 10 ml of a 22.2 ppb cyanide solution of potassium ferrocyanide $K_4[Fe(CN)_6]$ are used. The mineralization of the complex is complete after a capillary distillation of 30 minutes.

Figure 6:
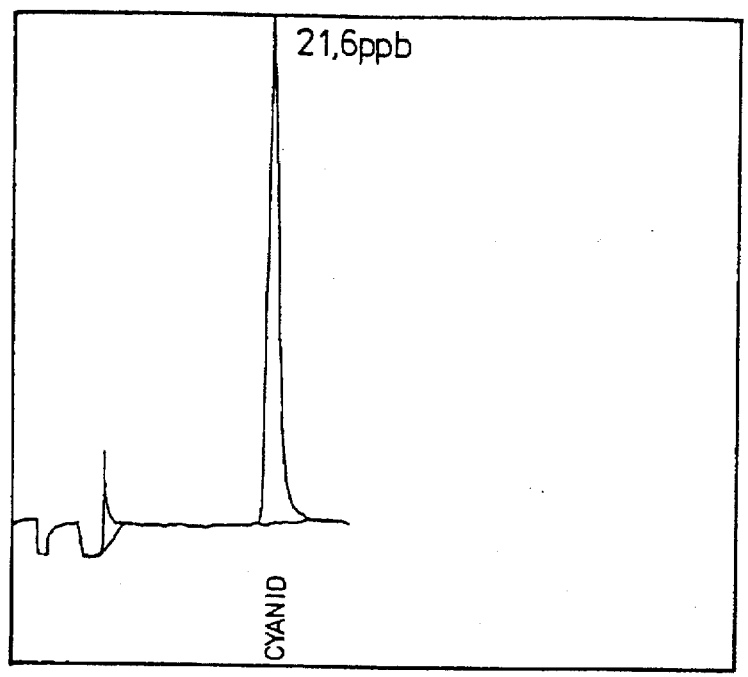

| Result: | Desired value | = | 22.2 ppb |
| --- | --- | --- | --- |
| | Effective value | = | 21.6 ppb (compare FIG. 6) |

EXAMPLE 7

Quantitative isolation of hydrocyanic acid in the presence of thiocyanate ions ($SCN^{31}$).

According to example 1, 5 ml of a 10 ppb standard cyanide solution, 5 ml of distilled water and 100 µm of a 1000 ppm potassium thiocyanate standard solution (pH 12), according to 10 ppm thiocyanate ions (1000-fold excess), are used and subjected to a capillary distillation for 30 minutes.

Figure 7:
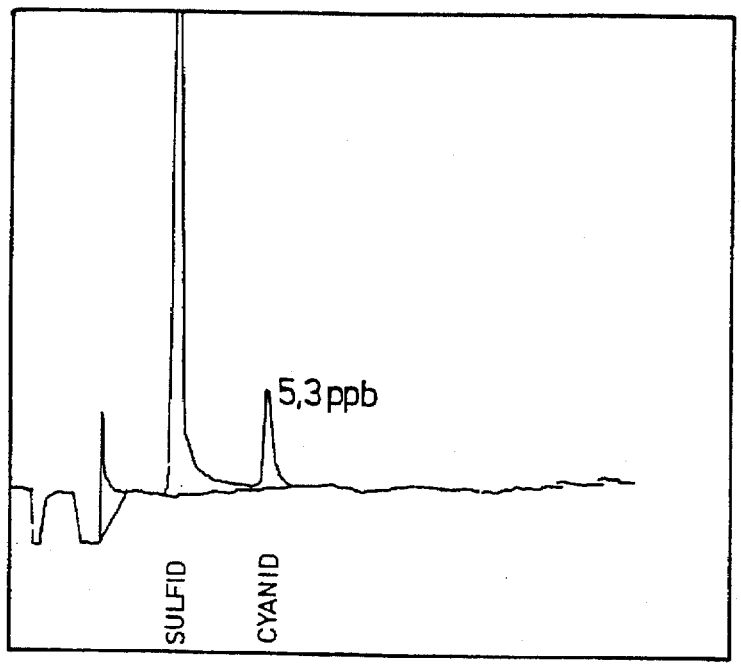

| Result: | Desired value | = | 5.0 ppb |
| --- | --- | --- | --- |
| | Effective value | = | 5.3 ppb (compare FIG. 7) |

The high peak in the chromatogram at a retention time of 7.02 min. shows sulfide ions (40 ppb approx.) which have caused a contamination of the potassium thiocyanate per analysis.

EXAMPLE 8

Simultaneous isolation of hydrocyanic acid and hydrogen sulfide, 10 ppb in each case, from corresponding standard solutions.

According to example 1, 10 ml of a 10 ppb standard cyanide solution (pH 12) and 0.1 ml of a 1 ppm standard sodium sulfide solution (pH 12) are used and subjected to a capillary distillation for 20 minutes.

Figure 8:
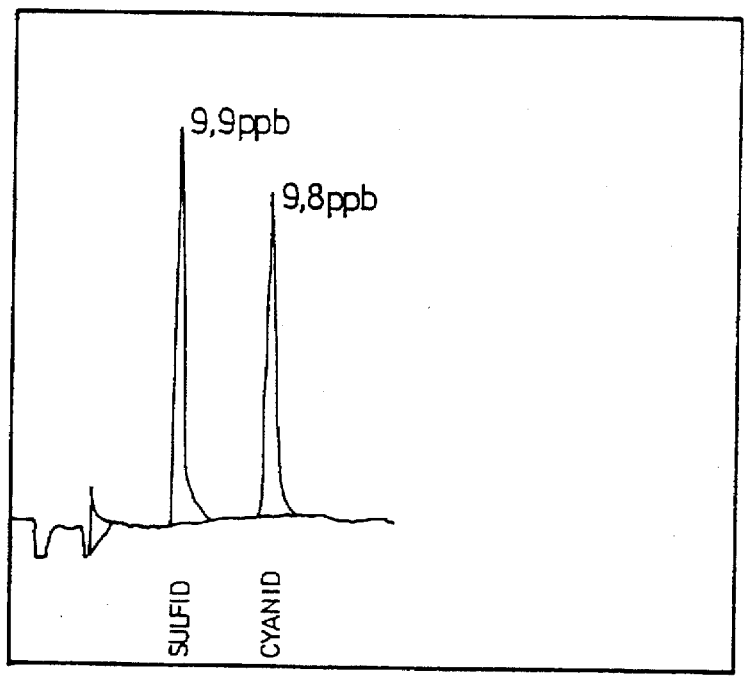

| Result: | Desired value cyanide | = | 10 ppb | Desired value sulfide | = | 10 ppb |
| --- | --- | --- | --- | --- | --- | --- |
| | Effect. value cyanide | = | 9.8 ppb | Effect. value sulfide | = | 9.9 ppb (compare FIG. 8) |

EXAMPLE 9

Quantitative isolation of hydrocyanic acid and hydrogen sulfide from an industrial waste water.

According to example 1, 10 ml of an original industrial waste water are used and subjected to the capillary distillation for 30 minutes. During this time, complexed cyanide and cyanide which can be easily liberated as well as hydrogen sulfide are isolated from sulfides.

Figure 9:
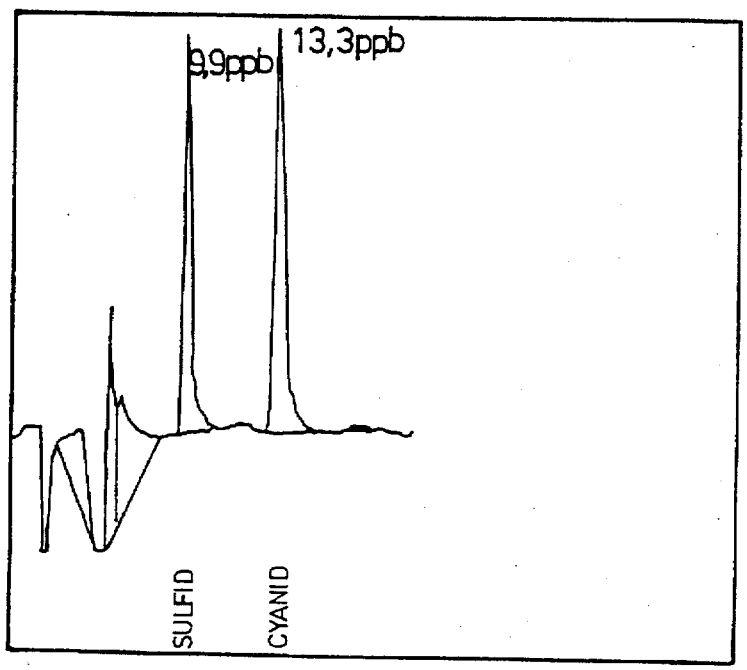

| Result: | Cyanide | = | 13.3 ppb |
| --- | --- | --- | --- |
| | Sulfide | = | 9.9 ppb (compare FIG. 9) |

EXAMPLE 10

Quantitative isolation of hydrocyanic acid and hydrogen sulfide from an industrial waste water.

According to example 1, 10 ml of an original industrial waste water are used and subjected to the capillary distillation for 30 minutes. During this time, complexed cyanide and cyanide which can be easily liberated as well as hydrogen sulfide are quantitatively isolated from sulfides.

Figure 10:
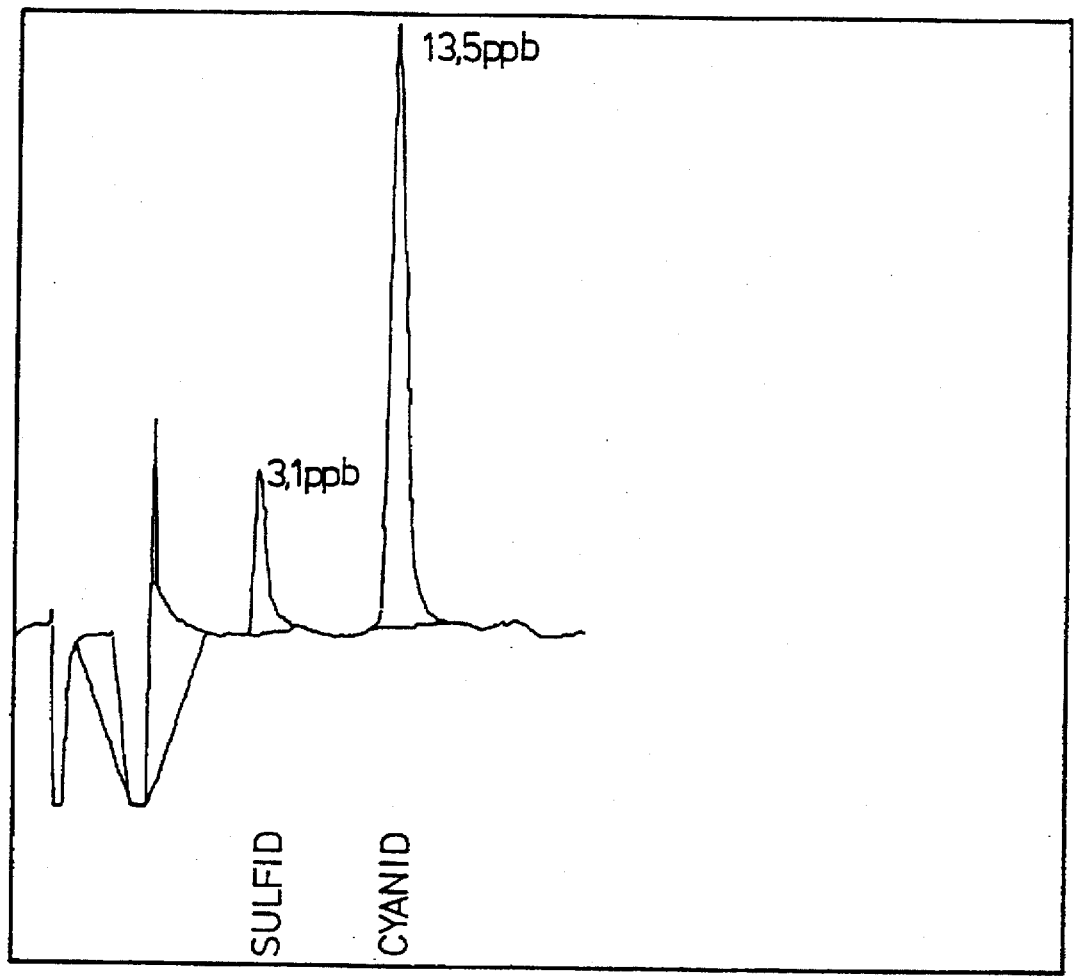

| Result: | Cyanide | = | 13.5 ppb |
| --- | --- | --- | --- |
| | Sulfide | = | 3.1 ppb (compare FIG. 10) |

EXAMPLE 11

Quantitative isolation of volatile substances from an infiltration water.

According to example 1, 2 ml of an original infiltration water are diluted with 5 ml of distilled water and subjected to the capillary distillation for 30 minutes without adding the acid mixture used in example 1. The volatile substances are condensed in n-pentane which is precooled to −5° C.

Evaporator vessel: beaded rim borosilicate glass with flanged cap

Filter plate: borosilicate glass, porosity range 40 to 100 μm

Capillary tube: "fused silica" inside diameter 0.32 mm

Condensing vessel: 10 ml beaded rim borosilicate glass with flanged cap

Absorbent: 2 ml of n-pentane, cooled to −5° C.

Figure 11:
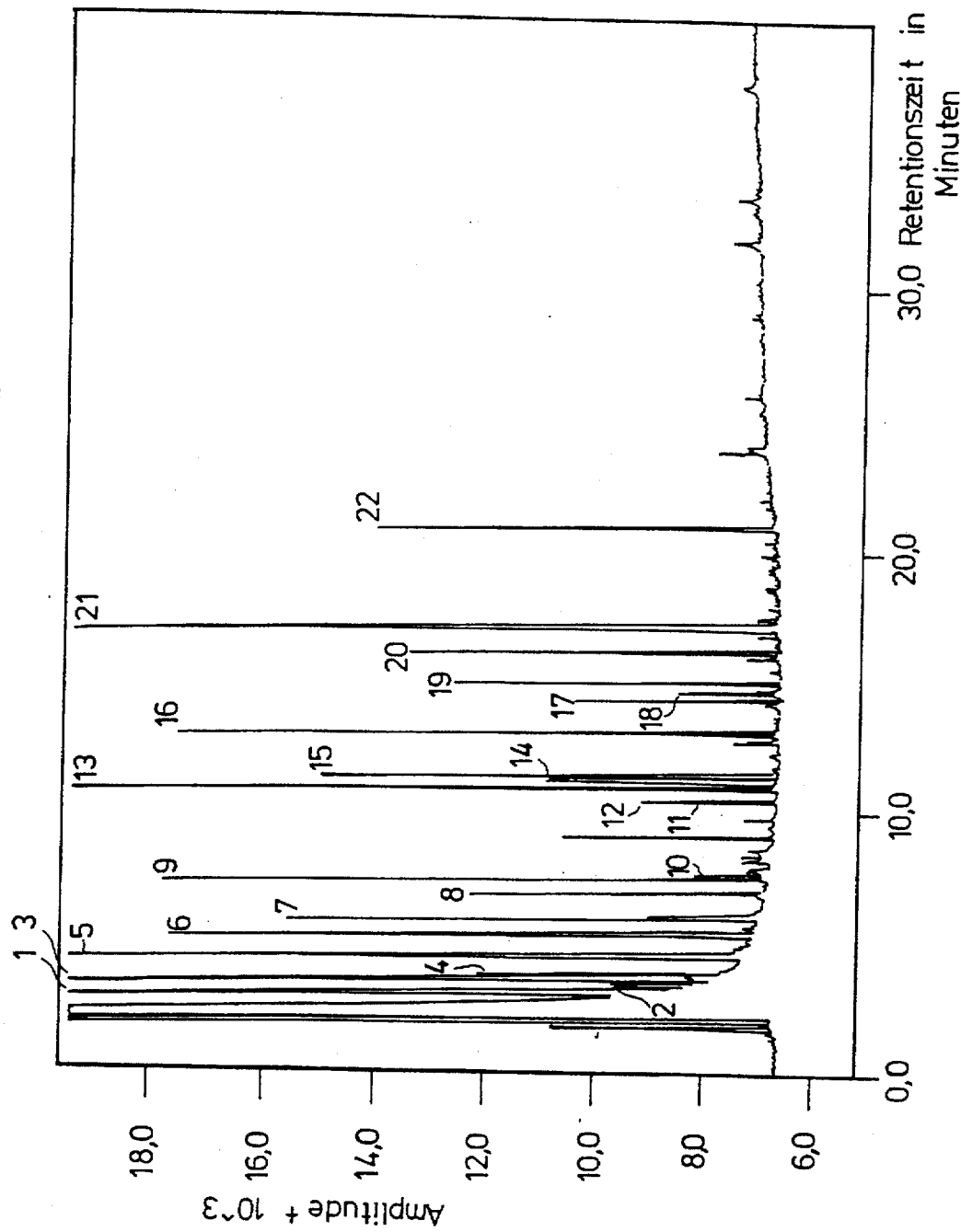
FIG. 11 shows gas chromatograms of different materials separated in accordance with the inventive method, as described in example 11 below.

Analytics: gaschromatography (compare FIG. 11)

In FIG. 11 are:
1. cis-1.2-dichloroethylene,
2. 1.1.1-trichloroethane,
3. benzene,
4. trichloroethylene,
5. toluene,
6. chlorobenzene,
7. tetrachloroethylene,
8. ethyl benzene,
9. m-, p-xylene,
10. o-xylene,
11. propylbenzene,
12. 1.3.5-trimethylbenzene,
13. 1.2.4-trimethylbenzene,
14. 1.2.3-trimethylbenzene,
15. p-dichlorobenzene,
16. o-dichlorobenzene,
17. 1.3.5-trichlorobenzene,
18. 1.2.4-trichlorobenzene,
19. 1.2.3-trichlorobenzene,
20. 1.2.3.5-tetrachlorobenzene,
21. 1.2.3.4-tetrachlorobenzene,
22. pentachlorophenol Range of concentration: ppb–ppm

| Data of FIG. 11 | | | | |
| --- | --- | --- | --- | --- |
| DATE | : 11.04.94 | / INJ (grd) | : | 250 / LSG-DERI V. |
| GC | : Dani 6500 | / DET (grd) | : | 300 / PRM (mg) |
| GRAPHER | : BD 8 | / OFEN A (grd) | : | 50 / LM |
| VORSCH. (cm/m/n) | : 1.0 | / OFEN E (grd) | : | 230 / LM.M.(m) |
| ATTENUATION | | / INIT (m/n) | : | 5.0 / DM |
| DET - SCHR. | : 1 × 16 | / FINAL (m/n) | : | 20.0 / DM.M.(m) |
| EINSPR. M. (mel) | :1.00 | /RATE grd/m/n) | : | 10.0 / TEMP (grd) |
| INJECTION | : H 7001 | | | / TIME (m/n) |

| Data of FIG. 11 | | | | |
|---|---|---|---|---|
| GAS | : HELIUM | /COLUMN | | : DB 5 |
| PRESSURE (bar) | : .4 | /LENGTH | (m) | : 30.0 |
| FLOW | : | /CARRIER | : ID-32 mm/FD-1 mu 6 | |
| DIGITAL | : | /No. + MATERIAL | | : FS 32100966 |
| SPLIT (m/mn) | : 1:15 | | | |

SAMPLE DESCRIPTION :
NOTES :

EXAMPLE 12

Quantitative isolation of ethanol from a water-ethanol mixture by means of fractionated capillary distillation.

According to example 1, a mixture of 9 ml of water and 1 ml of abs. ethanol (0.789 g) is used and distilled for 30 minutes by making use of a fused silica capillary tube of 1200 mm length.

Evaporator vessel: beaded rim borosilicate glass with flanged cap

Filter plate: borosilicate glass, porosity range 160 to 250 μm

Capillary tube: "fused silica" inside diameter 0.32 mm, length 1200 mm, room temperature Condensing vessel: 10 ml beaded rim borosilicate glass with flanged cap Absorbent: none Analytics: gaschromatography Result: 1.12 g condensate consisting of the whole amount of ethanol (96 per cent), rest=water. In the distillation residue only traces of ethanol could be detected gaschromatographically.

What is claimed is:

1. A method of quantitative enrichment of volatile compounds from at least one of liquid and suspended liquid substances, a processed amount of which lies in a macro-to-submicro range and which includes a volatile compound, by capillary distillation, said method comprising the steps of:

placing a predetermined amount of the at least one of liquid and suspended liquid substances into an evaporator having a bottom and at least one filter plate provided on the bottom for producing a continuous and constant stream of steam bubbles during boiling;

heating the at least one of the liquid and suspended liquid substances to a boiling temperature to boil the at least one of liquid and suspended liquid substances, forming the continuous constant stream of steam bubbles, whereby the volatile compound is evaporated from the at least one liquid and suspended liquid substances;

transferring the evaporated volatile compound from the evaporator to a condensing vessel via a capillary tube; and condensing the volatile compound in the condensing vessel;

wherein the transferring step includes transferring the volatile compound via the capillary tube having an inside diameter in a range of 0.20–0.53 mm, and wherein the placing step includes placing the predetermined amount of the at least one of liquid and suspended liquid substances into the evaporator with the at least one filter plate having a pore size between 40 and 250 μm and covering at least 25% of the bottom of the evaporator.

2. A method according to claim 1, wherein the at least one filter plate pore-size is between 160 and 250 μm.

3. A method according claim 1, wherein the at least one filter plate pore-size is between 100 and 160 μm.

4. A method according to claim 3, wherein the inside diameter of the capillary tube is 0.32 mm.

5. A method according to claim 1, wherein the at least one filter plate pore-size is between 40 and 100 μm.

6. A method according to claim 5, wherein the inside diameter of the capillary tube is 0.32 mm.

7. A method according to claim 1, wherein the capillary tube has a length of between 100 and 500 mm.

8. A method according to claim 7, wherein the inside diameter of the capillary tube is 0.32 mm.

9. A method according to claim 1, wherein the at least one filter plate is formed of a material selected from a group consisting of glass, quartz, porcelain, clay, precious metal and synthetic material.

10. A method according to claim 1, wherein the at least one filter plate is formed of borosilicate glass-material.

11. A method according to claim 1, wherein the capillary tube is formed of a material selected from a group consisting of fused amorphous silicon dioxide, teflon, and polyetherketone (PEEK).

12. A method according to claim 1, wherein the capillary tube is formed of fumed amorphous silicon dioxide and having an inner wall set to a pH-value above pH 4.5 by leaching.

13. An apparatus for the quantitative enrichment of volatile compounds from at least one of liquid and suspended substances, a processed amount of which lies in a macro- to sub-micro range and which contains the volatile compound by capillary distillation of the volatile compound, the apparatus comprising:

an evaporator having a bottom;

at least one filter plate provided on the bottom of the evaporator for producing a continuous and constant stream of steam bubbles during boiling;

a condensing vessel;

and a capillary tube for connecting the evaporator and the condensing vessel, wherein the capillary tube has an inside diameter of between 0.20 and 0.53 mm, and the at least one filter plate has a pore size of between 40 and 250 μm, and wherein the filter plate has a surface covering at least 25% of the bottom of the evaporator.

14. An apparatus according to claim 13, wherein the at least one filter plate has a pore size of between 160 and 250 μm.

15. An apparatus according to claim 14, wherein the capillary tube has an inside diameter of 0.32 mm.

16. An apparatus according to claim 13, wherein the at least one filter plate has a pore size of between 100 and 160 μm.

17. An apparatus according to claim 16, wherein the capillary tube has an inside diameter of 0.32 mm.

18. An apparatus according to claim 13, wherein the at least one filter plate has a pore size of between 40 and 100 µm.

19. An apparatus according to claim 18, wherein the capillary tube has an inside diameter of 0.32 mm.

20. An apparatus according to claim 13, wherein the capillary tube is arranged within a temperature controlling means.

21. An apparatus according to claim 13, wherein the capillary tube has a length between 100 and 150 mm.

22. An apparatus according to claim 13, wherein the capillary tube has a length of more than 500 mm.

23. An apparatus according to claim 13, wherein the at least one filter is formed of a material selected from a group consisting of glass, quartz, porcelain, clay, precious metal, and synthetic material.

24. A apparatus according to claim 13, wherein the at least one filter plate is formed of borosilicate.

25. An apparatus according to claim 13, wherein the capillary tube is formed of a material selected from a group of materials consisting of fused amphous silicon dioxide, teflon, or polyetheretherketone (PEEK).

26. An apparatus according to claim 13, wherein the capillary tube is formed of fused amorphous silicon dioxide and has an inner wall set to a pH-value above pH 4.5 by leaching.

* * * * *